July 18, 1944.  D. P. BISBEE ET AL  2,353,868
HEAD AND CYLINDER WELDING STAKE
Filed Jan. 2, 1942  4 Sheets-Sheet 1
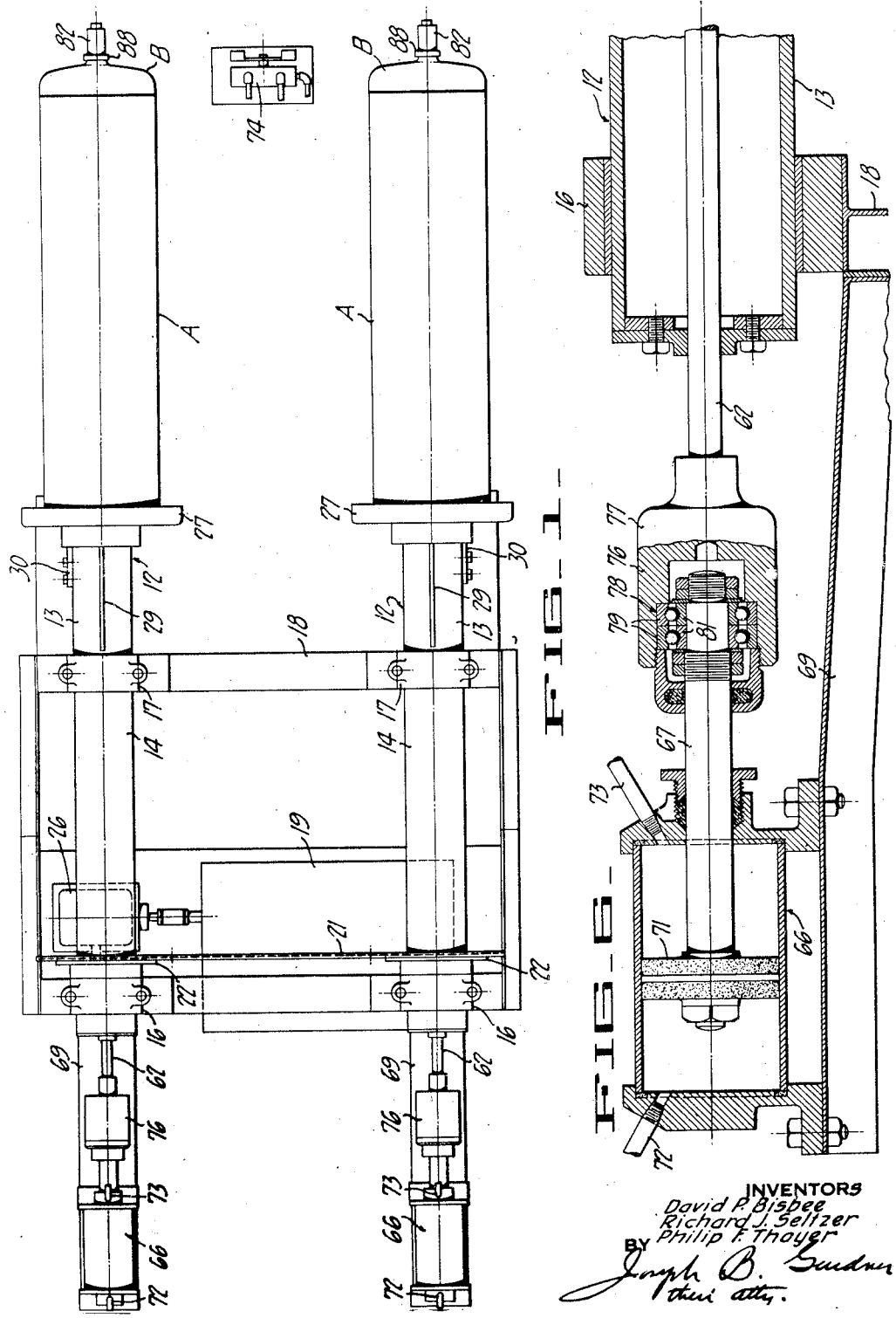
INVENTORS
David P. Bisbee
Richard J. Seltzer
Philip F. Thayer
BY Joseph B. Gardner
their atty.

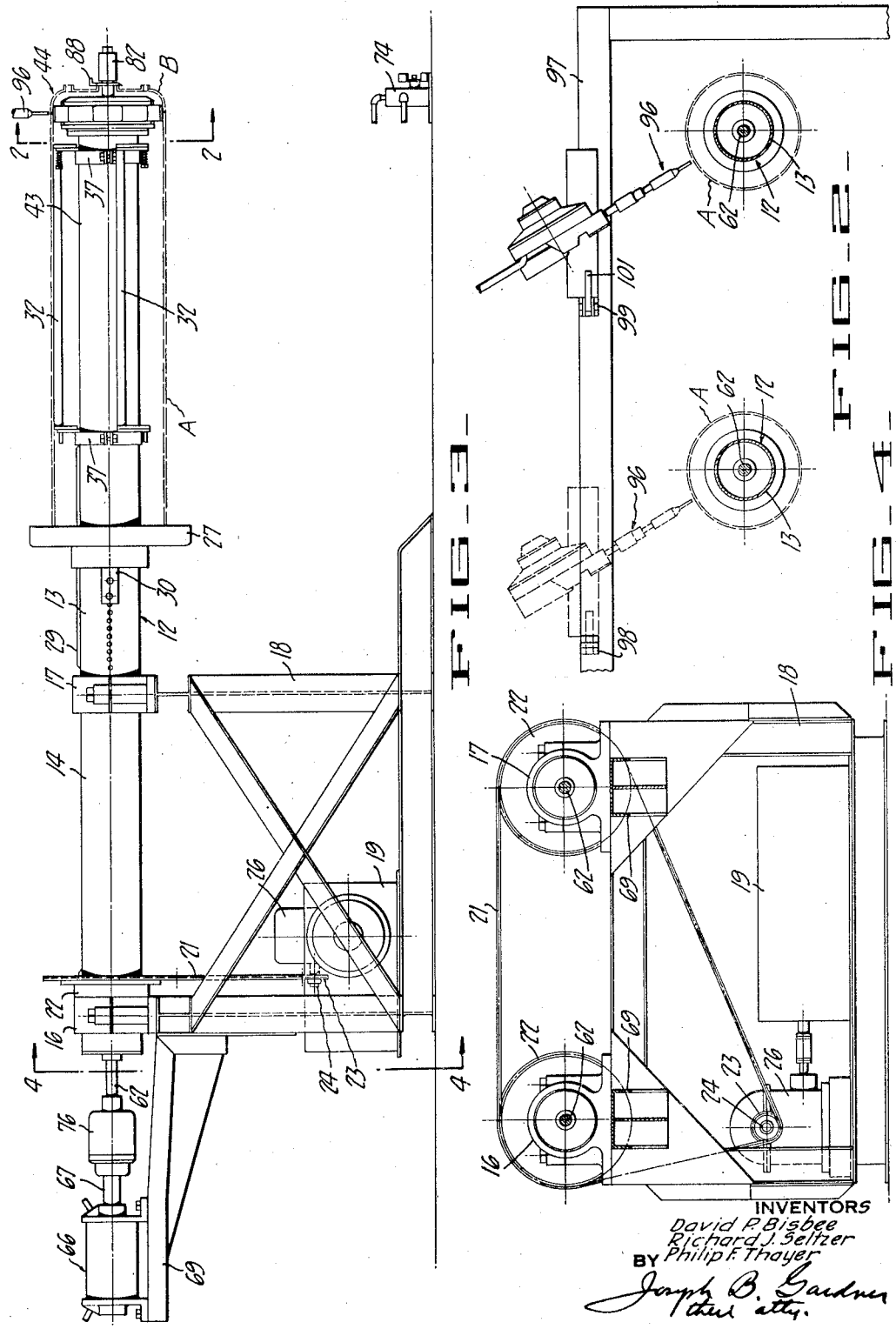

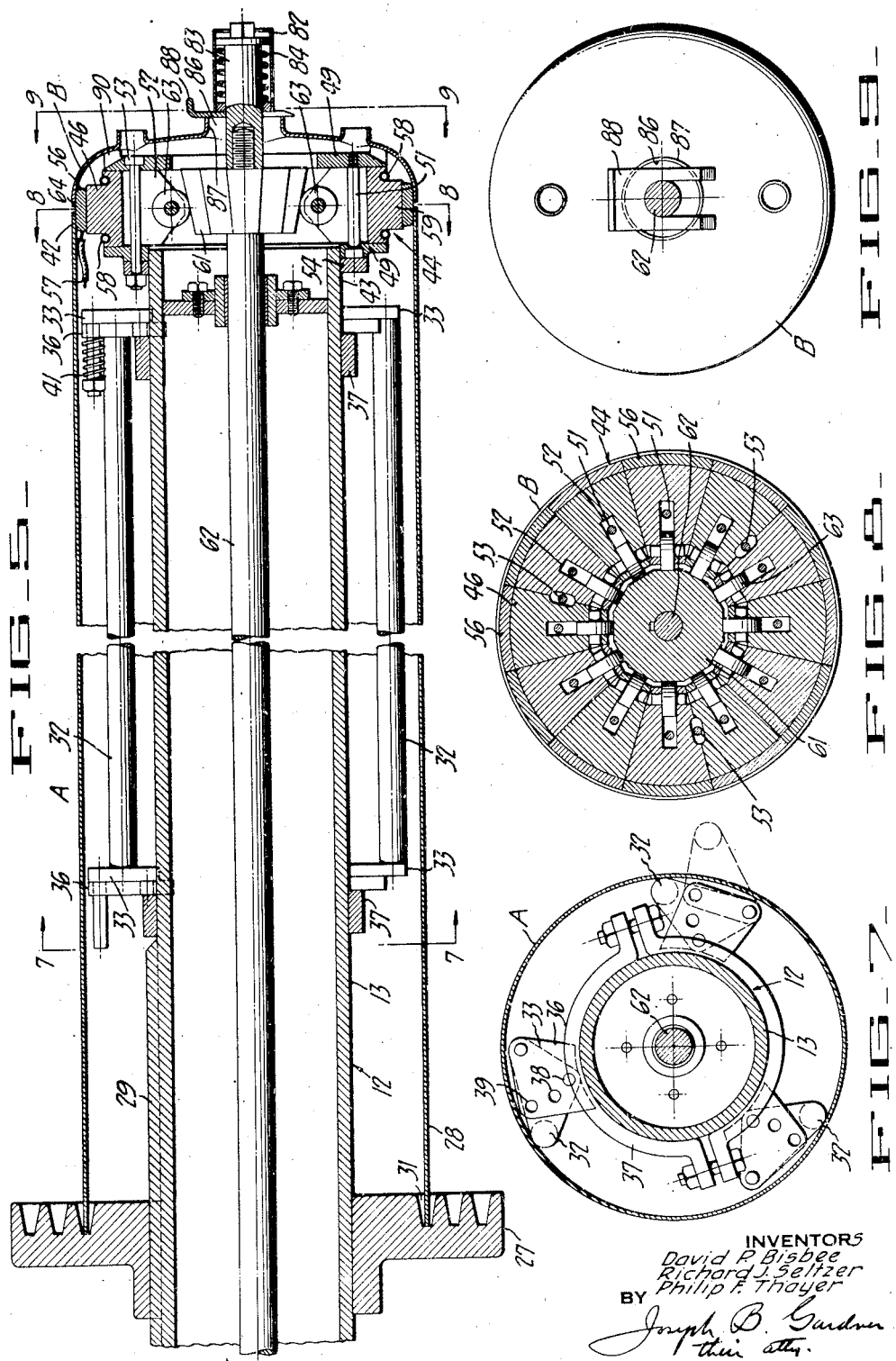

July 18, 1944.  D. P. BISBEE ET AL  2,353,868
HEAD AND CYLINDER WELDING STAKE
Filed Jan. 2, 1942  4 Sheets-Sheet 4
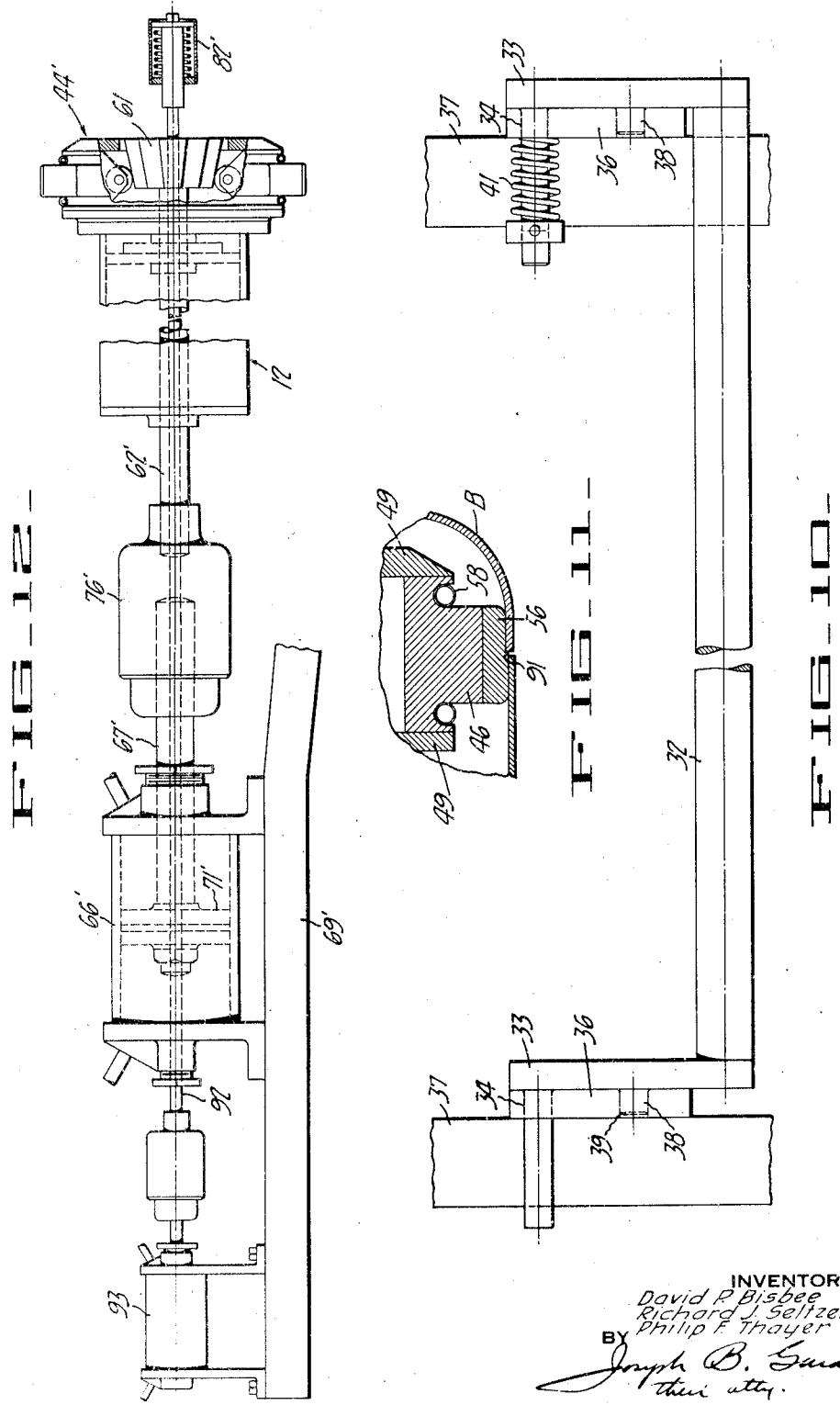
INVENTORS
David P. Bisbee
Richard J. Seltzer
Philip F. Thayer
BY Joseph B. Gardner
their atty.

Patented July 18, 1944

2,353,868

UNITED STATES PATENT OFFICE 2,353,868

HEAD AND CYLINDER WELDING STAKE

David P. Bisbee, San Marino, Calif., Richard J. Seitzer, Chicago, Ill., and Philip F. Thayer, Sparrows Point, Md., assignors to Rheem Manufacturing Company, Richmond, Calif., a corporation of California Application January 2, 1942, Serial No. 425,446

8 Claims. (Cl. 113—103)

The invention relates to a means of supporting or staking metal parts for a welding operation so that the need of a preliminary connecting of the parts, as by tack welding, is not required. More particularly the invention relates to a stake for use in welding cylindrical members such as a head and cylinder of a range boiler or the like.

An object of the invention is to provide means which will provide for the quick and effective staking of the cylinder and head for welding, will facilitate rapid and efficient welding of such members, and permit fast and easy removal of the product when the welding is completed.

A second object of the invention is to provide a means of the character described which will stake the cylinder and head for a butt-weld girthseam.

A third object of the invention is to provide a welding stake of the character described, which can be readily adjusted to accommodate pieces of work, that is the cylinders and heads or other parts or members to be welded, of different dimensions or forms.

A fourth object of the invention is to provide an apparatus of the character described which will permit the operator to remove the welded product from the stake and replace the same with new members to be welded, and to perform the entire welding operation without changing his position with respect to the apparatus.

A fifth object of the invention is to provide a stake of the character described which will serve to rectify any deformities in the shape of the work at the portions to be welded and present such portions in proper relation for an efficient weld.

A sixth object is to provide a stake of the character described in which the forces required for effecting the various operations are exerted by power or mechanical means, so as to reduce to a minimum the strain upon or the effort required on the part of the person operating the device.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of a pair of the stakes associated for operation together.

Figure 2 is a front end view of the units shown in Figure 1, with parts shown in section indicated by the line 2—2 in Figure 3.

Figure 3 is a side view of one of the stakes.

Figure 4 is a vertical transverse section view of the units taken on the line 4—4 of Figure 3.

Figure 5 is an enlarged sectional view of the forward portion of the mandrel on which the members to be welded are mounted, the parts being shown in position for supporting the members for the welding operation.

Figure 6 is a view similar to Figure 5, but of the rear portion of the mandrel.

Figures 7, 8 and 9 are transverse sectional views of the stake mandrel taken on the line 7—7, 8—8 and 9—9 of Figure 5.

Figure 10 is a fragmentary elevation of the cylinder guide on the mandrel.

Figure 11 is a fragmentary transverse section corresponding to Figure 5, but showing a slightly modified construction.

Figure 12 is a side elevation of a modified form of the mandrel.

In the fabrication of large capacity metal containers such as range boilers, the various parts such as the side and end walls are joined with a welded seam. It is common to join the head wall of the boiler to the cylindrical side walls by a lap weld or butt weld. Particularly in the case of the butt weld, it has been customary to tack weld the parts together at the joint in order that the parts will be held in proper relation to each other for and during the welding operation. This tacking or preliminary welding not only adds considerably to the time and effort in the fabrication, but frequently prevents an effective final weld of the parts at the point where the tacking occurs. The welding stake of our invention is designed to permit the welding of the girth seam between such parts as the head and cylinder without the necessity of tacking or preliminarily welding the parts together, and is particularly advantageous when the parts are to be connected by a butt weld, since in this type of weld the parts do not engage or rest one upon the other, but are positioned in substantially spaced or separated relation for and during the welding operation. The apparatus of our invention as presently designed, may be utilized for staking the parts for different types of welds; however, the description and drawings forming part of this application, explain and illustrate the stake for use in joining the cylinder and head with a butt weld.

In the drawings there is illustrated two complete staking apparatus which are associated in such manner as to provide much more efficient results than would be possible by using two apparatus in entirely separate or disjunctive relation. The advantages of associating the apparatus in pairs will be explained after the individual units are described.

The stake of our invention in the present embodiment, is arranged to permit welding of the parts together while the cylinder is in a horizontal position, and as here shown each stake unit or apparatus comprises a horizontally extending mandrel 12, over which a cylinder A and a boiler head B are arranged to be positioned and staked for the welding operation. The mandrel is supported exclusively at one end so that the cylinder and head may be readily inserted over the mandrel from the opposite end. The mandrel comprises a tube 13 which is mounted for rotation at its end 14 in suitable bearings 16 and 17, the bearings being supported upon a framework 18 preferably anchored to the floor or ground and arranged so as to position the mandrel about waist-high for an operator. Rotation of the tube is effected as here shown by a motor 19 having a driving connection with the tube through means of a chain 21 engaging on sprockets 22 and 23 mounted respectively on the tube and a shaft 24 of a speed reducer 26 operatively connected to the motor.

Mounted on the tube is a chuck 27 arranged for receiving and supporting the inner end 28 of the cylinder when the latter is disposed over the mandrel. The chuck is mounted for adjustment longitudinally of the tube so as to accommodate different lengths of cylinders and as here shown, the chuck is held against rotation on the tube by a spline 29 provided on the tube engaging in splineway in the chuck. The chuck is held against longitudinal displacement by means of a spacer 30 secured to the tube. As a means of holding the end of the cylinder in position the chuck is formed with an annular groove 31 of a diameter corresponding to the cylinder, and in order that the same chuck may be utilized for cylinders of different diameters as well as of different lengths, a plurality of such grooves are provided. The latter are arranged in concentric relation about the tube and the sides of the grooves are preferably flared so that the ends of the cylinders may be readily inserted therein.

Means is provided on the mandrel for guiding the cylinder over the tube so that the end 28 thereof will be led directly to the appropriate groove 31. Preferably such means is positioned about the mandrel for longitudinal and radial adjustment thereon and comprises as here shown a plurality of rods 32 having offset ends 33 which are mounted to turn in openings 34 provided in ears 36 of a pair of clamps 37. The rods 32 may be held in various positions transversely of the tube by means of pins 38 which are arranged for insertion in any of a plurality of openings 39 formed in the ears 36. The rods are urged by springs 41 to assume a longitudinally advanced position in which the pins 38 are retained in the openings 39, and as will be readily understood the rods may be moved to any of the various positions radially of the tube by retracting the rods and then permitting the ends to seat in the proper openings after the rods have been swung to desired position. Usually the rods which are preferably three in number, are set to permit a more or less loose fit with the inner sides of the cylinder, the end of the cylinder being guided to exact position by the tapering sides of the grooves 31 as aforementioned.

As will be understood, the cylinder end 42 to be welded to the boiler head, is the one opposite of the end 28, and is arranged to be positioned for such welding adjacent the outer or free end 43 of the mandrel. Mounted upon said latter end of the mandrel is an expandible member 44 designed to serve, first, as a means of supporting the boiler head on the mandrel, second, to hold the end portions of the cylinder and head in proper position for welding, and third, to back-up such portions and the seam therebetween during the welding operation. The member 44 comprises a plurality of blocks 46 arranged in circumferential alignment between a pair of disks 49 and mounted for radial movement therein. The disks are secured together and held in proper spaced relation by means of bolts 51 which extend through radial slots 52 in the blocks, and the member is secured to the mandrel for rotation with the tube 13 by means of bolts 53 which extend through a flange 54 on the tube. On the outer portion of the blocks are secured segmental back-up plates 56 preferably formed of copper and connected through the member and tube to a suitable ground wire 57 connected to one of the stationary parts of the apparatus, such as one of the bearings 16 or 17.

The blocks are normally held in a retracted position by a pair of coil spring ropes 58 seated within grooves 59 in the blocks. For moving the blocks radially outward against the resistance of the spring 58 there is provided a cone or wedge-member 61 arranged to engage the inner portion of the blocks. The wedge 61 is mounted on and keyed to a shaft 62 extending centrally through the expandible member and is preferably polygonal with one side for and opposite each block. Desirably, each block is provided with a roller 63 arranged for engagement with the adjacent side of the wedge, and as will be clear from the drawings, when the wedge is advanced axially through the member, the blocks will be forced radially outward in a smooth and uniform manner. Preferably a different diameter member 44 is used for cylinders of different width, and in order to permit the quick change of a member, the wedge is mounted for ready removal on the shaft 62.

As will be understood, both the cylinder end 42 and the end 64 of the boiler head to be welded thereto are designed to be positioned on the back-up plates 56 in substantially abutting relation, and in order that such end portions shall be of true cylindrical form for welding and an adequate back-up support be provided for the seam during the welding operation, the blocks should be forced outwardly with considerable force. To provide for this without imposing any strain on the operator, the movement of the wedge is arranged to be effected with power, and as here shown such movement is effected through means of an air cylinder 66 operatively associated with shaft 62. The latter, as will be clear from the drawings, extends clear through the tube and is provided with an extension 67 which extends into an air cylinder 66 mounted upon a bracket 69 secured to the frame 18. On the inside of the cylinder, the extension 67 is attached to a piston 71 which is caused to move axially in one direction or another in accordance with the pressure differential in the cylinder at opposite ends of the piston. Air under pressure is admitted to or withdrawn from the opposite ends of the cylinder through conduits 72 and 73, and the control of the air through such conduits is afforded through means of a manually operable valve 74 conveniently positioned on the floor near the outer end of the mandrel.

The shaft 62, due to the engagement of the sides of the wedge with the rollers on the blocks, will normally rotate with the tube, and in order that the piston 61 will not be required to turn in the cylinder, the extension 67 is connected with the shaft 62 by a coupling 76 which causes corresponding longitudinal movement of the members but permits relative rotational movement of one with respect to the other. The coupling comprises a body 77 secured to shaft 62 and having mounted therein a ball bearing 78, one of the rings 79 of which is fixed to the body while the complementary ring 81 is fixed to the shaft extension 67. As will be clear, the balls of the bearing permit relative rotation of the rings but not relative axial displacement.

As above explained, the boiler head as well as the cylinder is arranged to be supported on the expandible back-up member for reforming and welding, and such support serves to hold the edge portions of the head and cylinder in axial alignment. In addition to such support, means are provided for positioning the head in required proximity to the cylinder and for holding the head on the backing member in such position on the member, or in other words against movement axially of the cylinder. The said means is in the nature of a pressure device arranged to be applied to the outer side of the head, and as here shown such means is incorporated on the shaft 62 so that when the latter is moved to effect expansion of the blocks 46, the said means will move the head toward and retain it in proper relation with the cylinder. More specifically said means includes a sleeve 82 on an extension 83 of the shaft, and preferably mounted for limited axial displacement thereon against the resistance of a coil spring 84. The conventional boiler head is usually provided with an opening 86 which is defined by a flange 87 for a flue pipe, and in positioning the head over the mandrel the flange is inserted over the shaft section 83 so that the latter will project through the opening 86. The sleeve of course is of smaller diameter than the flange 87, and in order that the sleeve may operatively bear against the head, a yoke 88 of a size and form to engage the flange and sleeve, is arranged for removable positioning on the shaft between the flange and sleeve. As will be clear, when the pressure is operatively applied to the head, the latter will be effectively held against displacement away from the cylinder and in this manner the danger of the cylinder and head moving apart axially during the welding operation due to the heating and expansion of the edge portions at the seam, will be eliminated. Should it be desired to mechanically control the width of the seam between the cylinder and head, there may be provided on the outer disk 49 of the expandible member 44 a suitable means such as the member 90 for limiting the inward positioning of the head on the blocks, or as shown in Figure 11, the segments may be formed with a peripheral shoulder 91 for engagement by the inner edge of the head.

In the modified form of the invention illustrated in Figure 12, the pressure or axial back-up means for the head is mounted on a shaft 92 which extends completely through the wedge operating shaft 62' and the air cylinder 66', and is operatively connected with an air cylinder 93 for movement independent of the shaft 62'. With this arrangement the axial pressure may be applied to the head in advance of or following the application of the radial pressure by the blocks. If desired the resiliently held sleeve 82' may be replaced by a fixed member 94.

In preparing the stake for use, an expandible member 44 of a circumference appropriate for the particular diameter of cylinder to be operated upon, is bolted to the tube, and at the same time the guide rods 32 are adjusted to serve with such cylinder. Likewise the chuck 29 is set in accordance with the length of the cylinder.

In the use of the stake when it is thus fitted and adjusted, with the member 44 in contracted position, an operator inserts a cylinder over the mandrel from the free end thereof and advances it therealong until the end 28 of the cylinder guided by the rods 32 enters the appropriate groove 31 in the chuck and seats in the base thereof. This positions the opposite end 42 of the cylinder centrally upon the segments of the back-up member. The boiler head is then slipped over the sleeve 82 with the end 64 innermost, and the yoke 88 inserted between the sleeve and the flange 87. After the head is positioned in proper circumferential relationship with the cylinder, the operator manipulates the valve 74 to cause the air cylinder to move the wedge so as to expand the blocks and force the back-up segments against the edge portions 42 and 64 of the cylinder and head respectively. At the same time, the head is moved inwardly by the sleeve 82 to position the edge 64 in desired relationship for butt welding. With the work thus firmly held in position the operator applies a welding electrode such as indicated at 96 to the outer side of the seam and the mandrel allowed to rotate until the entire seam is welded. He may then release the work by causing the cylinder to move the wedge backward so that the blocks under the force of the springs 58 will return to retracted position. By then removing the yoke the united cylinder and boiler may be withdrawn from the mandrel and the apparatus is then ready for another staking and welding operation.

The speed at which the mandrel is arranged to be rotated is governed by the type of welding, and also by the circumference of the cylinder.

The staking as well as the welding operation may be effected while the mandrel is either intermittently rotated or kept in continuous rotation, and it has been found that by adding a second mandrel and arranging it in side by side relation with the first mandrel and with the free ends in corresponding positions, that the same operator can by alternate operations on the mandrels, readily handle both at the same time and thereby considerably increase the output. With such an arrangement, not only may a common supporting frame be utilized, but the same driving means may be used to rotate both mandrels. Such an arrangement likewise lends itself to ready and correct application of the welding head to the different mandrels. By reference to Figure 2, it will be seen that the welding head 96 and associated members are mounted upon a track 97 extending across and above the mandrels. The welding head is arranged for movement from an operative position with respect to one mandrel to a correspondnig position with respect to the other mandrel, and vice versa, and means, such as stops 98 and 99, are provided on the track for limiting the movement of the head so that it will automatically stop at each mandrel in proper operative position for welding the work thereon. Preferably a latch 101 is associated with the welding head and arranged to engage the stops so as to releasably retain the head in back of the operative positions. When the welding operation on one mandrel is completed, the operator releases the latch and moves the head to the other mandrel until the latch engages the other stop. It will thus be clear that with practically no effort and care on the part of the operator, the correct positioning of the head is assured.

We claim:

1. A welding stake for a girth seam for cylindrical members including a hollow cylinder with open ends, comprising a mandrel arranged to receive the cylinder thereabout and supported at one end to rotate about a horizontal axis, a chuck mounted on said mandrel intermediate the ends thereof and formed to receive and support one end of said cylinder, an expanding welding back-up means at the free end of said mandrel arranged to engage the inner side of the edge portions of the other end of said cylinder and of the end of the member to be connected therewith and hold said portions in axial alignment, stop means on the member engaging portion of said back-up means for limiting axial movement of one of the members thereon said stop means formed to engage the end face of the engaged member while the member is supported on said member-engaging portion, and means to rotate said mandrel.

2. A welding take for a girth seam for cylindrical members including a hollow cylinder with open ends, comprising a mandrel arranged to receive the other of said members and the cylinder thereabout by insertion over one end of the mandrel and being mounted at the other end for rotation, an expanding welding back-up means carried by said mandrel at said first end arranged to engage the inner-side of said cylinder at the end to be welded to the other member, and a chuck on said mandrel between the mounted end thereof and said back-up means formed to receive and support cylinder ends of different diameters and mounted for axial adjustment on said mandrel to accommodate cylinders of different lengths.

3. A welding stake for a girth seam for cylindrical members including a hollow cylinder with open ends, comprising a mandrel arranged to receive said cylinder thereover and mounted at one end to rotate horizontally about its longitudinal axis, a chuck adjustably mounted on said mandrel intermediate the ends thereof for axial displacement thereon and formed to receive and support cylinder ends of different diameters, an expanding welding back-up means on said mandrel at the other end thereof arranged to engage the inner side of said cylinder at the end opposite that to be engaged by said chuck, and means on said mandrel intermediate said chuck and back-up means for guiding the cylinder over the mandrel into operative engagement with the chuck.

4. A welding stake for a girth seam for cylindrical members including a hollow cylinder and a member having a cylindrical end portion for connection with the end portion of the cylinder, comprising a horizontally extending mandrel arranged to receive said cylinder over an end thereof and mounted at the other end to rotate about its longitudinal axis, a centering means for the cylinder mounted on said mandrel inwardly of the first mentioned end thereof and arranged to receive the other end of the cylinder, means on the mandrel for guiding the cylinder thereover for engagement with said centering means, welding back-up means on said mandrel adjacent the first mentioned end thereof and comprising a plurality of radially movable elements arranged for engagement at their outer ends with the inner side of said end portions of the cylinder and member, power operated means for moving said elements outwardly to engage said cylinder and member and hold same in longitudinal alignment, and power operated means movable longitudinally of the mandrel to engage and hold said member against longitudinal displacement on said mandrel.

5. A welding stake for a girth seam for cylindrical members including a hollow cylinder and a member having a cylindrical end portion for connection with the end portion of the cylinder, comprising a horizontally extending mandrel arranged to receive said cylinder over an end thereof and mounted at the other end to rotate about its longitudinal axis, a centering means for the cylinder mounted on said mandrel inwardly of the first mentioned end thereof and arranged to receive the other end of the cylinder, means on the mandrel for guiding the cylinder thereover for engagement with said centering means, welding back-up means on said mandrel adjacent the first mentioned end thereof and comprising a plurality of radially movable elements arranged for engagement at their outer ends with the inner side of said end portions of the cylinder and member, means for moving said elements extending through said mandrel from substantially the mounted to the free end thereof and connected at the mounted end of the mandrel to a source of power for actuation of such means, and means operatively associated with said element moving means located at the free end of the mandrel for engaging the free end of said member for holding the member against longitudinal outward displacement on said back-up means.

6. A welding stake for a girth seam for cylindrical members including a hollow cylinder and a member having a cylindrical end portion for connection with the end portion of the cylinder, comprising a horizontally extending mandrel arranged to receive said cylinder over an end thereof and mounted at the other end to rotate about its longitudinal axis, a centering means for the cylinder mounted on said mandrel inwardly of the first mentioned end thereof and arranged to receive the other end of the cylinder, means on the mandrel for guiding the cylinder thereover for engagement with said centering means, welding back-up means on said mandrel adjacent the first mentioned end thereof and comprising a plurality of radially movable elements arranged for engagement at their outer ends with the inner side of said end portions of the cylinder and member, means for moving said elements extending through said mandrel from substantially the mounted to the free end thereof and connected at the mounted end of the mandrel to a source of power for actuation of such means, control means for said element moving means located adjacent the free end of said mandrel, power operated means located at the free end of the mandrel for engaging the free end of said member for holding the member against longitudinal outward displacement on said back-up means.

7. A welding stake for a girth seam for cylindrical members including a hollow cylinder and a member having a cylindrical end portion for connection with an end portion of the cylinder, comprising a horizontally extending mandrel arranged to receive said cylinder over an end thereof and mounted at the other end to rotate about its longitudinal axis, a centering means for the cylinder mounted on said mandrel for longitudinal adjustment thereon arranged to receive and hold the free end of the cylinder in concentric relation to the mandrel, means radially adjustable on said mandrel for guiding the cylinder into operative engagement with said centering means, welding back-up means on said mandrel adjacent the free end thereof and comprising a plurality of radially movable segments arranged for engagement at their outer ends with the inner side of said end portions of the cylinder and member, means for moving said segments extending through said mandrel from substantially the mounted to the free end thereof and connected at the mounted end to a source of power for actuation of such means, control means for said segment moving means located adjacent the free end of said mandrel, and means operatively connected with said segment moving means located at the free end of said mandrel for engaging the free end of said member and holding the member against longitudinal displacement on said back-up means.

8. A welding stake for a girth seam for cylindrical members including a hollow cylinder and a member having a cylindrical end portion for connection with an end portion of the cylinder, comprising a pair of horizontally extending mandrels positioned in side by side relation with their axes parallel, means providing an exclusive mounting for said mandrels at a common end of the mandrels and supporting same for rotation about their axes, each of said mandrels arranged to receive one of said cylinders over the free end thereof, means including an annular welding back-up device on each of said mandrels to support the cylinder and the member to be connected therewith in longitudinal alignment and against relative longitudinal displacement and with the corresponding portions of the cylinder and members to be connected transversely aligned, a welding member mounted for movement back and forth from operative position relative to the portions to be welded on one mandrel to the portions to be welded on the other mandrel, means serving to stop the welding member in operative position with relation to each of said mandrels when moved from one mandrel to the other, and means for simultaneously rotating said mandrels.

DAVID P. BISBEE.
RICHARD J. SELTZER.
PHILIP F. THAYER.